US012427786B2

(12) United States Patent
Motegi

(10) Patent No.: US 12,427,786 B2
(45) Date of Patent: Sep. 30, 2025

(54) LIQUID DISCHARGE APPARATUS

(71) Applicant: Akio Motegi, Tokyo (JP)

(72) Inventor: Akio Motegi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 132 days.

(21) Appl. No.: 18/103,490

(22) Filed: Jan. 31, 2023

(65) Prior Publication Data

US 2023/0241886 A1 Aug. 3, 2023

(51) Int. Cl.
*B41J 2/21* (2006.01)
*B41J 2/165* (2006.01)

(52) U.S. Cl.
CPC ......... *B41J 2/2146* (2013.01); *B41J 2/16579* (2013.01); *B41J 2/16585* (2013.01); *B41J 2/2142* (2013.01); *B41J 2/2139* (2013.01)

(58) Field of Classification Search
CPC .. B41J 2/2142; B41J 2/16579; B41J 2/16585; B41J 2/2146; B41J 2/2139
See application file for complete search history.

(56) References Cited

U.S. PATENT DOCUMENTS 7,431,420 B2 * 10/2008 Inoue ..................... B41J 2/1707 347/29
2011/0316925 A1 * 12/2011 Saita ..................... B41J 2/2142 347/19
2013/0083107 A1 * 4/2013 Nishikawa ............. B41J 2/0451 347/10
2021/0197567 A1 7/2021 Yoda et al.
2022/0009246 A1 1/2022 Motegi
2022/0396072 A1 12/2022 Motegi

FOREIGN PATENT DOCUMENTS

JP 2012-201033 10/2012
JP 2016-159581 9/2016
JP 2020-146947 9/2020
JP 2021-107144 7/2021

* cited by examiner

*Primary Examiner* — Geoffrey S Mruk
(74) *Attorney, Agent, or Firm* — XSENSUS LLP

(57) ABSTRACT

A liquid discharge apparatus includes a liquid discharge head, circuitry, and an image detector. The liquid discharge head includes multiple nozzles and discharges a liquid from the multiple nozzles. The circuitry causes the liquid discharge head to discharge the liquid onto a recording medium to form an image in an image area of the recording medium in a printing operation. The image detector reads the image formed on the recording medium. The circuitry further causes the liquid discharge head to discharge the liquid onto at least one of a leading end or a trailing end of the recording medium to form a flushing pattern different from the image in a flushing operation, causes the image detector to read the flushing pattern, detect a defective part in the flushing pattern read by the image detector, and identify a defective nozzle among the multiple nozzles based on defective part.

12 Claims, 9 Drawing Sheets

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-014529, filed on Feb. 1, 2022, in the Japan Patent Office, the entire disclosure of which is hereby incorporated by reference herein.

BACKGROUND

Technical Field

Embodiments of this disclosure relate to a liquid discharge apparatus.

Related Art

In the related art, a liquid discharge apparatus includes a liquid discharge head in which multiple nozzles are arranged and discharges a liquid such as ink onto a recording medium. The liquid discharge head discharges the liquid in the nozzles in a flushing operation (also referred to as dummy discharge or purge) to discharge thickened ink in the nozzles.

SUMMARY

Embodiments of the present disclosure describe an improved liquid discharge apparatus that includes a liquid discharge head, circuitry, and an image detector. The liquid discharge head includes multiple nozzles and discharges a liquid from the multiple nozzles. The circuitry causes the liquid discharge head to discharge the liquid from the multiple nozzles onto a recording medium conveyed in a conveyance direction to form an image in an image area of the recording medium in a printing operation. The image detector reads the image formed on the recording medium by the liquid discharge head. The circuitry further causes the liquid discharge head to discharge the liquid from the multiple nozzles onto at least one of a leading end or a trailing end of the recording medium in the conveyance direction to form a flushing pattern different from the image on said at least one of the leading end or the trailing end of the recording medium in a flushing operation, causes the image detector to read the flushing pattern on the recording medium, detect a defective part in the flushing pattern read by the image detector, and identify a defective nozzle among the multiple nozzles based on defective part.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
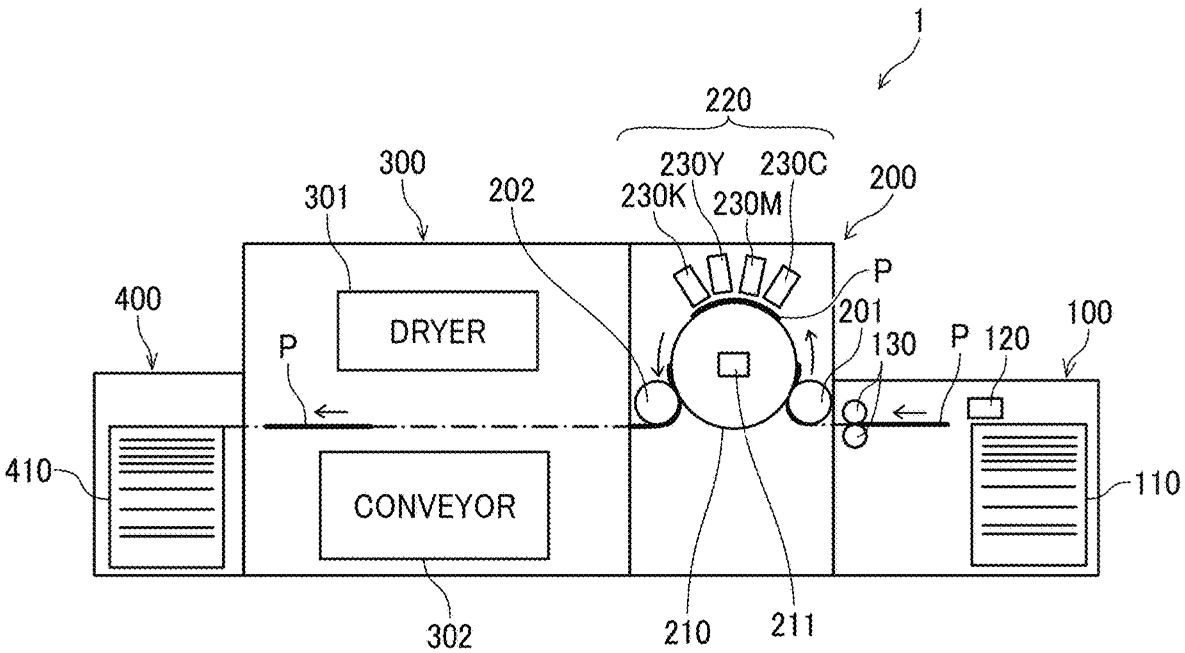
FIG. 1 is a schematic view of a printer according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings.

Overall Description

FIG. 1 is a schematic view of a printer 1 which is an inkjet recording apparatus as a liquid discharge apparatus according to the present embodiment. The printer 1 includes a sheet feeding unit 100, an image forming unit 200, a drying unit 300, and a sheet output unit 400. In the printer 1, the image forming unit 200 forms an image with ink as a liquid for image formation on a sheet P as a recording medium fed from the sheet feeding unit 100. After the drying unit 300 dries the ink adhering to the sheet P, the sheet P is output in the sheet output unit 400.

Sheet Feeding Unit

As illustrated in FIG. 1, the sheet feeding unit 100 includes a sheet feeding tray 110 on which a plurality of sheets P is stacked, a feeding device 120 that separates and feeds the sheets P one by one from the sheet feeding tray 110, and a registration roller pair 130 that feeds the sheets P to the image forming unit 200.

As the feeding device 120, any feeding device, such as a device using rollers or a device using air suction, can be used. After the leading end of the sheet P fed from the sheet feeding tray 110 by the feeding device 120 reaches the registration roller pair 130, the registration roller pair 130 is driven at a predetermined timing to feed the sheet P to the image forming unit 200. In the present embodiment, the configuration of the sheet feeding unit 100 is not limited to any particular configuration as long as the sheet feeding unit 100 can feed the sheet P to the image forming unit 200.

Image Forming Unit

Figure 2:
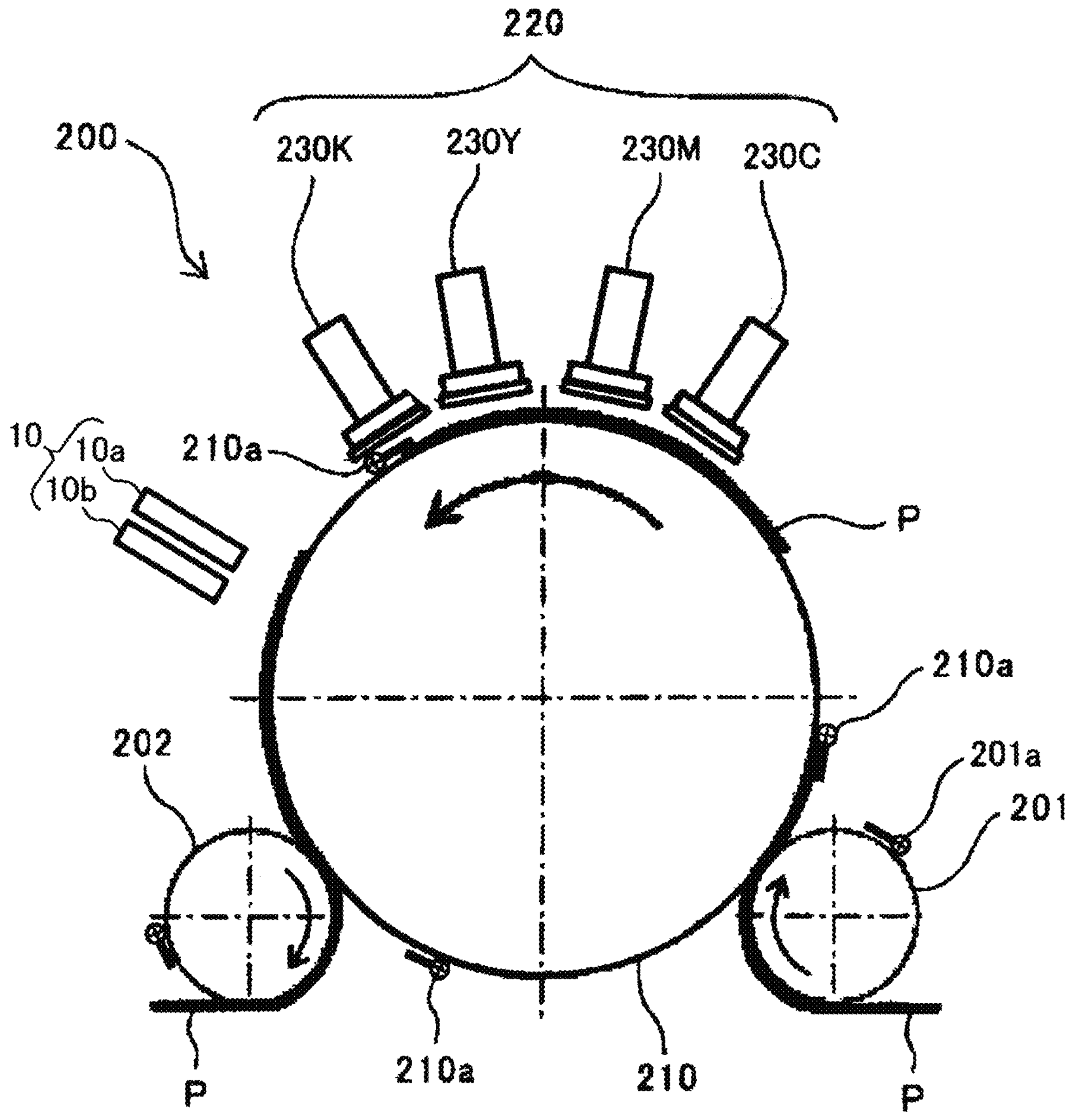
FIG. 2 is a schematic view of an image forming unit of the printer in FIG. 1.

The image forming unit 200 includes a receiving cylinder 201, a sheet conveyance drum 210 (conveyor), an ink discharge unit 220, and a delivery cylinder 202. FIG. 2 is a schematic view of the image forming unit 200.

The receiving cylinder 201 receives the sheet P (i.e., the recording medium) fed from the sheet feeding unit 100 and conveys the sheet P downstream. The sheet conveyance drum 210 has a cylindrical shape and conveys the sheet P, which is conveyed from the receiving cylinder 201, carried on the outer circumferential surface thereof. The ink discharge unit 220 discharges ink toward the sheet P conveyed by the sheet conveyance drum 210. The delivery cylinder 202 delivers the sheet P conveyed by the sheet conveyance drum 210 to the drying unit 300.

The leading end of the sheet P conveyed from the sheet feeding unit 100 to the image forming unit 200 is gripped by a sheet gripper 201*a* disposed on the surface of the receiving cylinder 201. The sheet P is conveyed along with the movement of the surface of the receiving cylinder 201. The sheet P conveyed by the receiving cylinder 201 is transferred to the sheet conveyance drum 210 at a position facing each other.

A sheet gripper 210*a* is also disposed on the sheet conveyance drum 210, and the leading end of the sheet P transferred to the sheet conveyance drum 210 is gripped by the sheet gripper 210*a*. Multiple suction holes are dispersedly formed on the surface of the sheet conveyance drum 210. A suction device 211 generates a suction air flow toward the inside of the sheet conveyance drum 210 through each suction hole.

The leading end of the sheet P transferred from the receiving cylinder 201 to the sheet conveyance drum 210 is gripped by the sheet gripper 210*a*. Thereafter, the sheet P is sucked onto the sheet conveyance drum 210 by the suction air flow and is conveyed in a conveyance direction as the sheet conveyance drum 210 moves.

The ink discharge unit 220 according to the present embodiment discharges ink of four colors of C (cyan), M (magenta), Y (yellow), and K (black) to form an image and includes individual liquid discharge heads 230 (230C, 230M, 230Y, and 230K) for each ink. Since the four liquid discharge heads 230 have the same configuration except that the colors of ink to be discharged are different, in the following description, suffixes such as "C," "M," "Y," and "K" indicating the colors of ink to be discharged are appropriately omitted.

The configuration of the liquid discharge head 230 is not limited to any particular configuration and may be any configuration that can discharge a liquid from a discharge orifice (nozzle) of the liquid discharge head 230. In the present embodiment, the liquid discharge head 230 includes multiple nozzles arranged in a nozzle row in a nozzle array direction orthogonal to the conveyance direction. In some embodiments, the ink discharge unit 220 may include a liquid discharge head that discharges special ink such as white, gold, and silver or a liquid discharge head that discharges a surface coating liquid that does not form an image.

Liquid discharge operations of the four liquid discharge heads 230 of the ink discharge unit 220 are controlled by drive signals corresponding to image data. When the sheet P conveyed by the sheet conveyance drum 210 passes through a region facing the ink discharge unit 220, color inks are discharged from the four liquid discharge heads 230 to form an image corresponding to the image data. In the present embodiment, the configuration of the image forming unit 200 is not limited to any particular configuration as long as an image is formed by applying a liquid onto the sheet P.

Drying Unit

As illustrated in FIG. 1, the drying unit 300 includes a dryer 301 and a conveyor 302. The dryer 301 dries ink adhered to the sheet P by the image forming unit 200. The conveyor 302 conveys the sheet P conveyed from the image forming unit 200.

The sheet P conveyed from the image forming unit 200 is received by the conveyor 302, then conveyed so as to pass through the dryer 301, and delivered to the sheet output unit 400. When the sheet P passes through the dryer 301, ink on the sheet P is subjected to a drying process. Accordingly, liquid components such as moisture in the ink are evaporated, the ink is fixed on the sheet P, and curling of the sheet P is prevented.

Sheet Output Unit

The sheet output unit 400 includes an output tray 410 on which a plurality of sheets P is stacked. The sheet P conveyed from the drying unit 300 is sequentially stacked and held on the output tray 410. In the present embodiment, the configuration of the sheet output unit 400 is not limited to any particular configuration and may be any configuration that can stack the sheet P ejected from the drying unit 300.

Other Functional Units

As described above, the printer 1 according to the present embodiment includes the sheet feeding unit 100, the image forming unit 200, the drying unit 300, and the sheet output unit 400. However, other functional units may be added as appropriate. For example, a pretreatment unit that treats the sheet P before image formation may be added between the sheet feeding unit 100 and the image forming unit 200. Alternatively, an aftertreatment unit that treats the sheet P after the image formation may be added between the drying unit 300 and the sheet output unit 400.

For example, the pretreatment unit applies a pretreatment liquid, which reacts with ink, to the sheet P to reduce bleeding of the ink. However, the content of the pretreatment is not limited particularly. For example, the aftertreatment unit reverses the sheet P on which the image is formed by the image forming unit 200 and sends the sheet P again to the image forming unit 200 to form images on both sides of the sheet P, or binds a plurality of sheets P on which the image is formed. However, there is no particular limitation on the content of the aftertreatment performed by the aftertreatment unit.

In the present embodiment, the printer 1 which is the inkjet recording apparatus as an example of the liquid discharge apparatus is described. The printer 1 includes the liquid discharge head 230 that discharges ink as a liquid toward a surface to be dried of the sheet P. In the present embodiment, each of the liquid discharge heads 230 includes a plurality of liquid discharge head modules arranged in a sheet width direction, which is orthogonal to a conveyance direction of the sheet P, to form a long liquid discharge head (line head). Unless otherwise specified, the "liquid discharge head" means the "line head."

Each of the liquid discharge heads 230 according to the present embodiment is a line-type liquid discharge head having a length (length in a main scanning direction) across the sheet P in the sheet width direction and discharges ink onto the sheet P. In the present embodiment, the individual liquid discharge heads 230 are radially arranged around a rotation shaft of the sheet conveyance drum 210.

Figure 3:
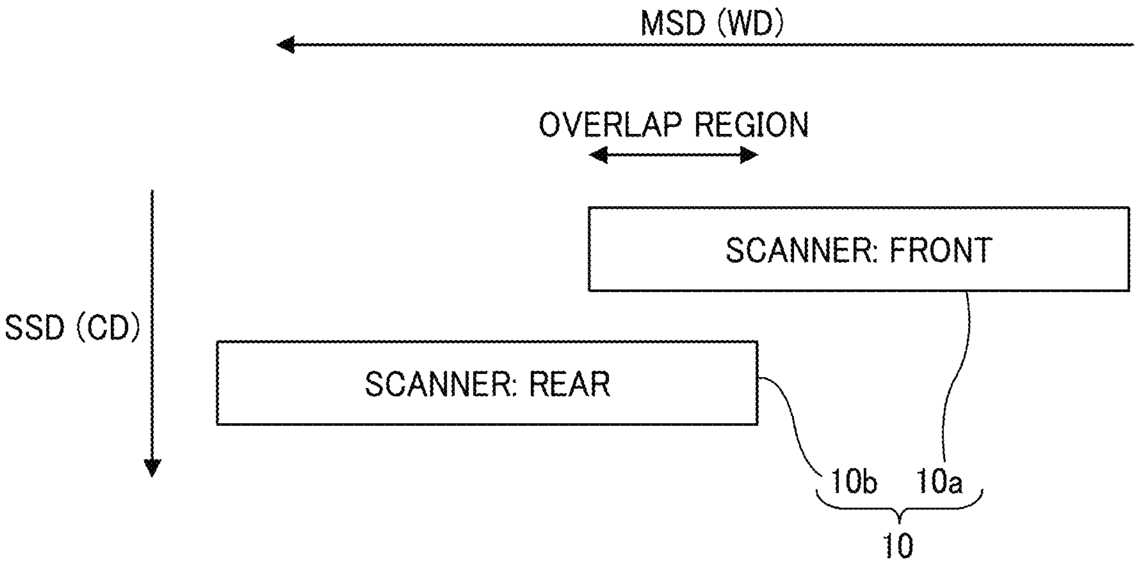
FIG. 3 is a diagram illustrating arrangement of a first in-line sensor and a second in-line sensor of the image forming unit in FIG. 2.

A scanner unit 10 as an image detector is disposed downstream from the ink discharge unit 220 in the conveyance direction of the sheet P so as to face the sheet conveyance drum 210. The scanner unit 10 includes a first in-line sensor 10*a* and a second in-line sensor 10*b*. As illustrated in FIG. 3, the first in-line sensor 10*a* is disposed on one side in the main scanning direction (sheet width direction) indicated by arrow MSD (or arrow WD) in FIG. 3, and the second in-line sensor 10*b* is disposed on the other side in the main scanning direction.

In the present embodiment, the first in-line sensor 10*a* and the second in-line sensor 10*b* are disposed at different positions in a sub-scanning direction (conveyance direction) indicated by arrow SSD (or arrow CD) in FIG. 3. An end of the first sensor 10*a* on the other side and an end of the second in-line sensor 10*b* on the one side overlap each other in the main scanning direction (an overlap region illustrated in FIG. 3). As a result, the first in-line sensor 10*a* and the second in-line sensor 10*b* can read the image formed on the sheet P continuously over the entire area of the sheet P in the main scanning direction. Note that the first in-line sensor 10*a* and the second in-line sensor 10*b* are also collectively referred to as the in-line sensors 10*a*, and 10*b* in the following description.

Figure 4:
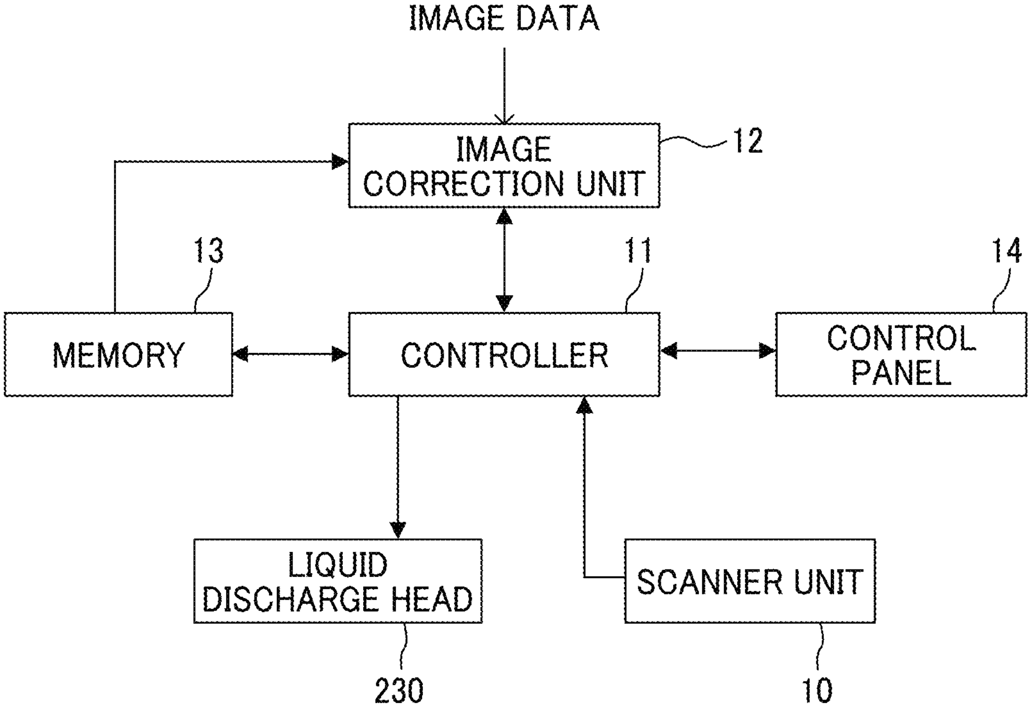
FIG. 4 is a block diagram illustrating a defective nozzle identification control.

FIG. 4 is a block diagram illustrating a control for identifying a defective nozzle according to the present embodiment (i.e., a defective nozzle identification control). A controller 11 as circuitry (also referred to as a determination unit) includes a central processing unit (CPU), a random access memory (RAM), a read only memory (ROM), and the like. The scanner unit 10, the liquid discharge head 230, an image correction unit 12 which is also serves as the circuitry, a memory 13, and a control panel 14 are connected to the controller 11. Examples of the memory 13 include a nonvolatile storage unit such as a flash memory or a hard disk drive (HDD). The memory 13 stores data of the defective nozzle identified in the defective nozzle identification control, a drive waveform for driving the liquid discharge head, and the like. Examples of the drive waveform stored in the memory 13 include a printing drive waveform for printing an image on the sheet P in a printing operation, a flushing drive waveform for perform a flushing operation (also referred to as dummy discharge or purge) to discharge (flush) ink in the nozzle. The image correction unit 12 corrects input image data based on the data of the defective nozzle stored in the memory 13.

The ROM of the controller 11 stores a determination program for detecting the presence or absence of the defective nozzle to determine whether to execute the defective nozzle identification control, a control program for executing the defective nozzle identification control, and the like. These programs are loaded and executed by the CPU. The ROM of the controller 11 also stores a control program for controlling a liquid discharge by the liquid discharge head 230 based on the drive waveform stored in the memory 13. The control program is loaded and executed by the CPU.

In a defective nozzle detection control according to the present embodiment, the scanner unit 10 reads a flushing pattern formed by performing the flushing operation on a leading end margin and a trailing end margin of the sheet P during a consecutive printing operation to detect the presence or absence of the defective nozzle. In the defective nozzle identification control, a test pattern for identifying the defective nozzle is formed on the sheet P, and the scanner unit 10 reads the test pattern to identify the defective nozzle.

Figure 5:
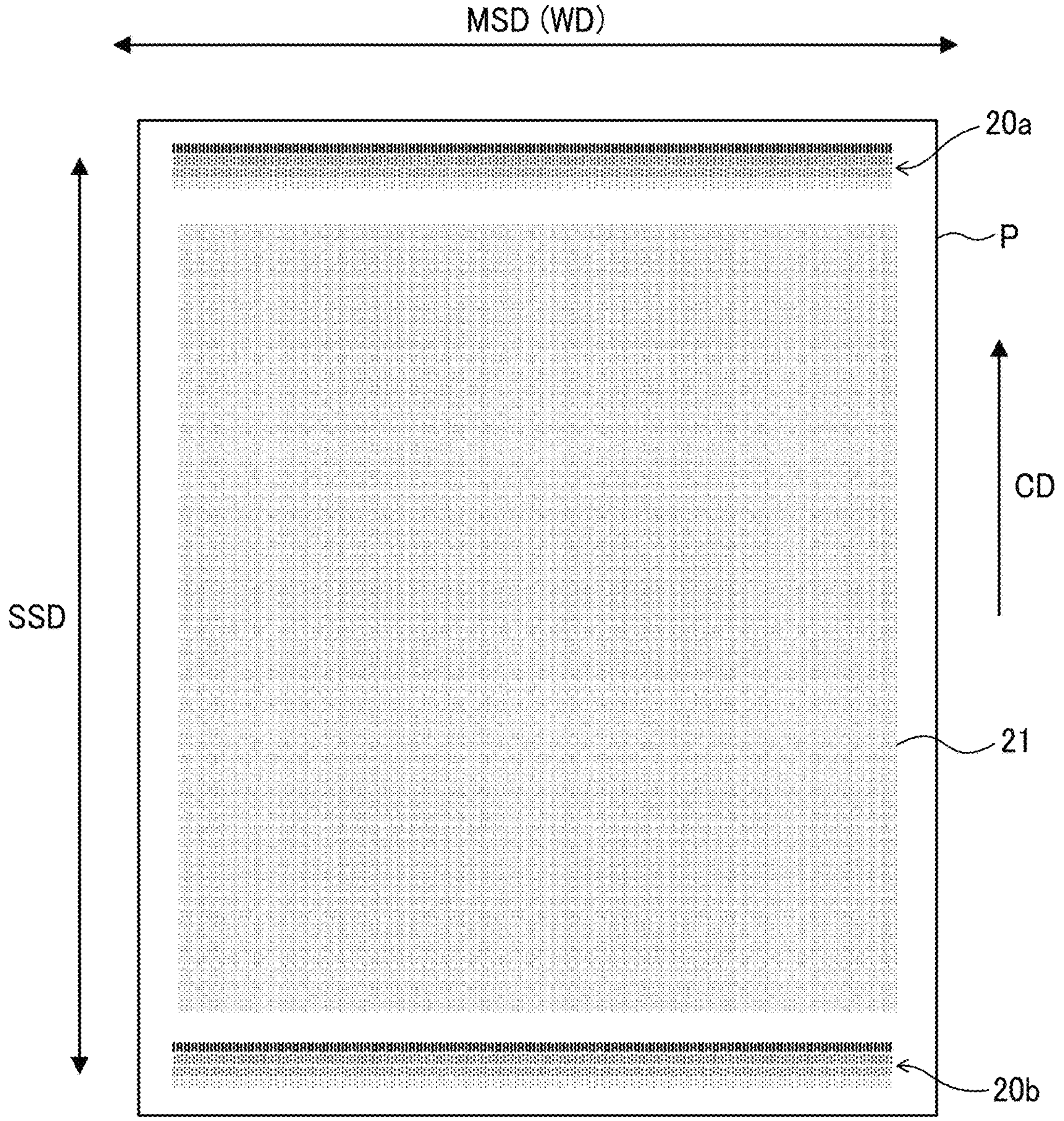
FIG. 5 is a diagram of a flushing pattern formed on a sheet during a consecutive printing operation.

FIG. 5 is a diagram of the flushing pattern formed on the sheet P during the consecutive printing operation. As illustrated in FIG. 5, a first flushing pattern 20*a* is formed in the leading end margin, that is, a leading end of the sheet P disposed downstream from a print image area 21 of the sheet P, in which a print image is to be formed, in the conveyance direction of the sheet P. In addition, a second flushing pattern 20*b* is formed in the trailing end margin, that is, a trailing end of the sheet P disposed upstream from the print image area 21 of the sheet P in the conveyance direction of the sheet P. Each of the first flushing pattern 20*a* and the second flushing pattern 20*b* includes patterns of four colors of K, C, M, and Y. Note that the first flushing pattern 20*a* and the second flushing pattern 20*b* are also collectively referred to as the flushing patterns 20*a* and 20*b*, and each of which is simply referred to as the flushing pattern unless distinguished in the following description.

The liquid discharge head 230 controls the liquid discharge with the flushing drive waveform, which is different from the printing drive waveform, to discharge the ink so as to form each of the flushing patterns 20*a* and 20*b*. The flushing drive waveform causes the liquid discharge head 230 to discharge the ink at a discharge velocity higher than a discharge velocity of the ink discharged by the printing drive waveform. Alternatively, the flushing drive waveform causes the liquid discharge head 230 to discharge a volume of the ink larger than a volume of the ink discharged by the printing drive waveform. The flushing drive waveform may cause the liquid discharge head 230 to discharge the larger volume of the ink at the higher discharge velocity than that of the ink discharged by the printing drive waveform. Such a flushing drive waveform described above enables the liquid discharge head 230 to sufficiently discharge the thickened ink in the nozzle.

Figure 6:
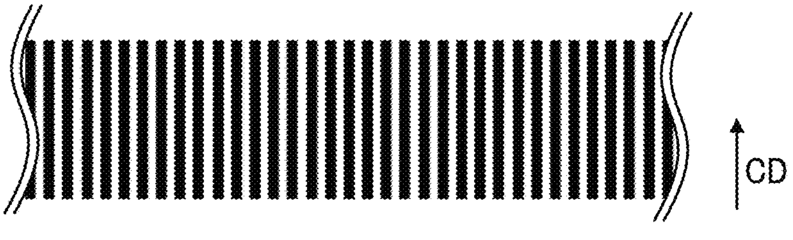
FIG. 6 is an enlarged diagram of the flushing pattern for black.

FIG. 6 is an enlarged diagram of the flushing pattern for color of K. The flushing pattern for color of K is described below, and the same applies to the other colors of C, M, and Y. As illustrated in FIG. 6, the flushing pattern for color of K includes multiple line images which are arranged in parallel in the main scanning direction and each of which extends in the sub-scanning direction (conveyance direction indicated by arrow CD in FIG. 6). The liquid discharge head 230K discharges the ink from every other nozzle to form the flushing pattern for color of K, When the liquid discharge head 230 includes multiple nozzles having a resolution of 1200 dots per inch (dpi) in the main scanning direction, the flushing pattern is formed at the resolution of 600 dpi. The nozzles used to form the second flushing pattern 20*b* in the trailing end margin are not used to form the first flushing pattern 20*a* in the leading end margin. As a result, the liquid discharge head 230 can discharge (flush) the ink in all the multiple nozzles.

In the above description, the liquid discharge head 230 discharges the ink from every other nozzle to form the flushing pattern, but the liquid discharge head 230 may discharge the ink from every three or more nozzles to form the flushing pattern. For example, when the liquid discharge head 230 discharges the ink from every four nozzles to form the flushing pattern, the liquid discharge head 230 forms the flushing pattern with different nozzles in each of the leading end margin and the trailing end margin of the two sheets P during the consecutive printing operation. When the liquid discharge head 230 discharges the ink from every three nozzles to form the flushing pattern, the liquid discharge head 230 forms the flushing pattern with different nozzles in the leading end margin of each of the three sheets P during the consecutive printing operation. As a result, the liquid discharge head 230 can discharge the ink in all the multiple nozzles.

Figure 7A:
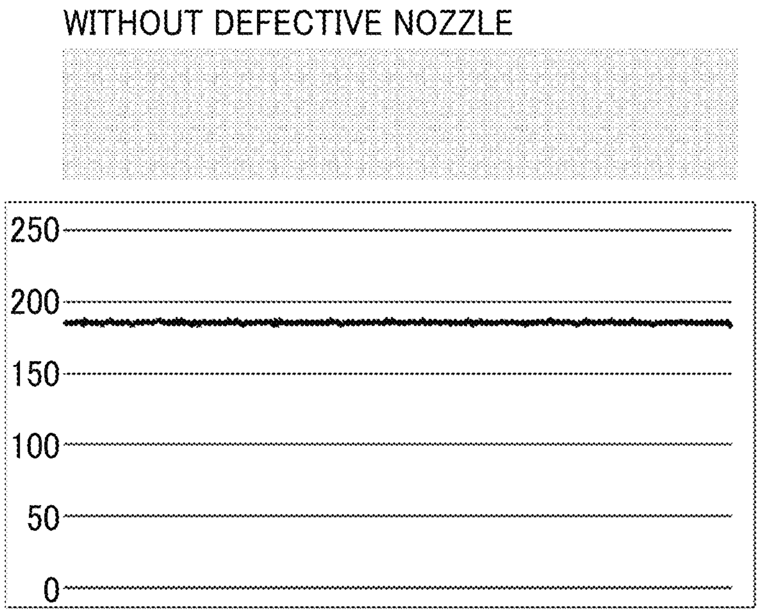
FIG. 7A is a graph illustrating pixel values of a read image of the flushing pattern without a defective nozzle to be used.
Figure 7B:
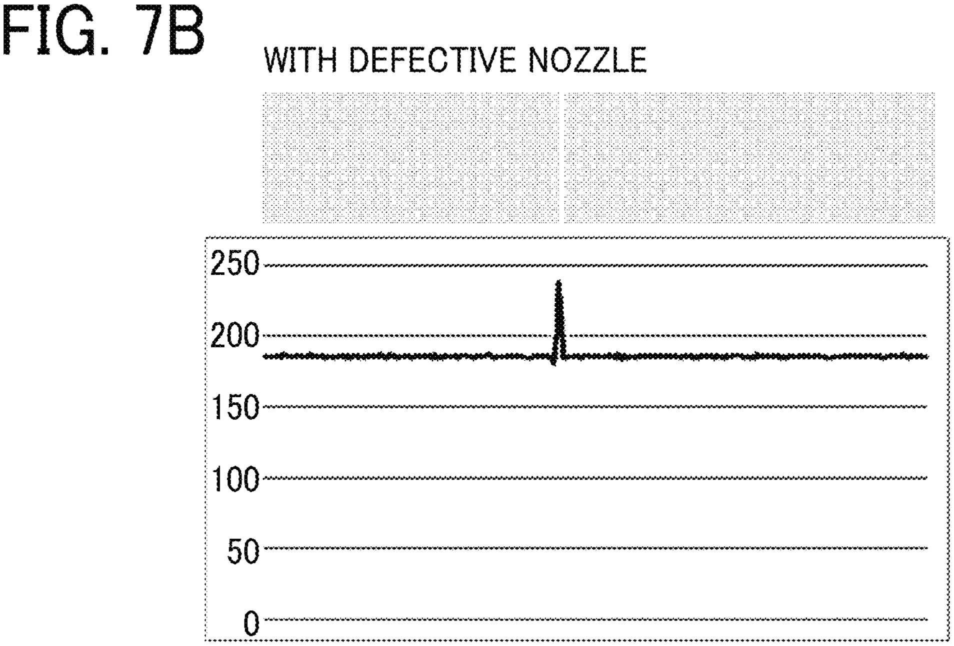
FIG. 7B is a graph illustrating the pixel values of the read image of the flushing pattern with the defective nozzle to be used.

As described above, the scanner unit 10 reads the flushing patterns formed in the leading end margin and the trailing end margin of the sheet P to detect whether the liquid discharge head 230 fails to discharge the ink from a certain nozzle (i.e., the defective nozzle). FIG. 7A illustrates pixel values of the read image of the flushing pattern without the defective nozzle to be used, and FIG. 7B illustrates the pixel values of the read image of the flushing pattern with the defective nozzle to be used.

As illustrated in FIG. 7A, without the defective nozzle, the read image read by the scanner unit 10 has substantially the same pixel value in the main scanning direction. On the other hand, with the defective nozzle, since the ink is not discharged from the defective nozzle, a white streak (i.e., a defective part or an abnormal image) appears in the flushing pattern as illustrated in FIG. 7B. As a result, the read image read by the scanner unit 10 has a portion having a high pixel value in the main scanning direction. The controller 11 detects whether there is a portion having a pixel value that exceeds a threshold in the flushing pattern. When there is a pixel with the pixel value exceeding the threshold, the controller 11 determines that there is a defective nozzle from which the liquid discharge head 230 fails to discharge the ink.

In the present embodiment, since the flushing patterns 20*a* and 20*b* are formed using the flushing drive waveform, the discharge velocity of the ink is higher or the volume of the ink discharged is larger than when the print image is formed in the printing operation. As a result, the line images extending in the sub-scanning direction of the flushing patterns 20*a* and 20*b* become fat in the main scanning direction. If the flushing patterns 20*a* and 20*b* are formed by all the multiple nozzles, adjacent line images may overlap each other. Accordingly, even if there is a defective nozzle, the white streak may not appear in the flushing pattern.

On the other hand, in the present embodiment, since the flushing pattern is formed by every other nozzle, the line images do not overlap each other. Accordingly, when there is a defective nozzle, the defective nozzle causes the white streak in the flushing pattern. Thus, the defective nozzle can be reliably detected from the flushing pattern.

Figure 8:
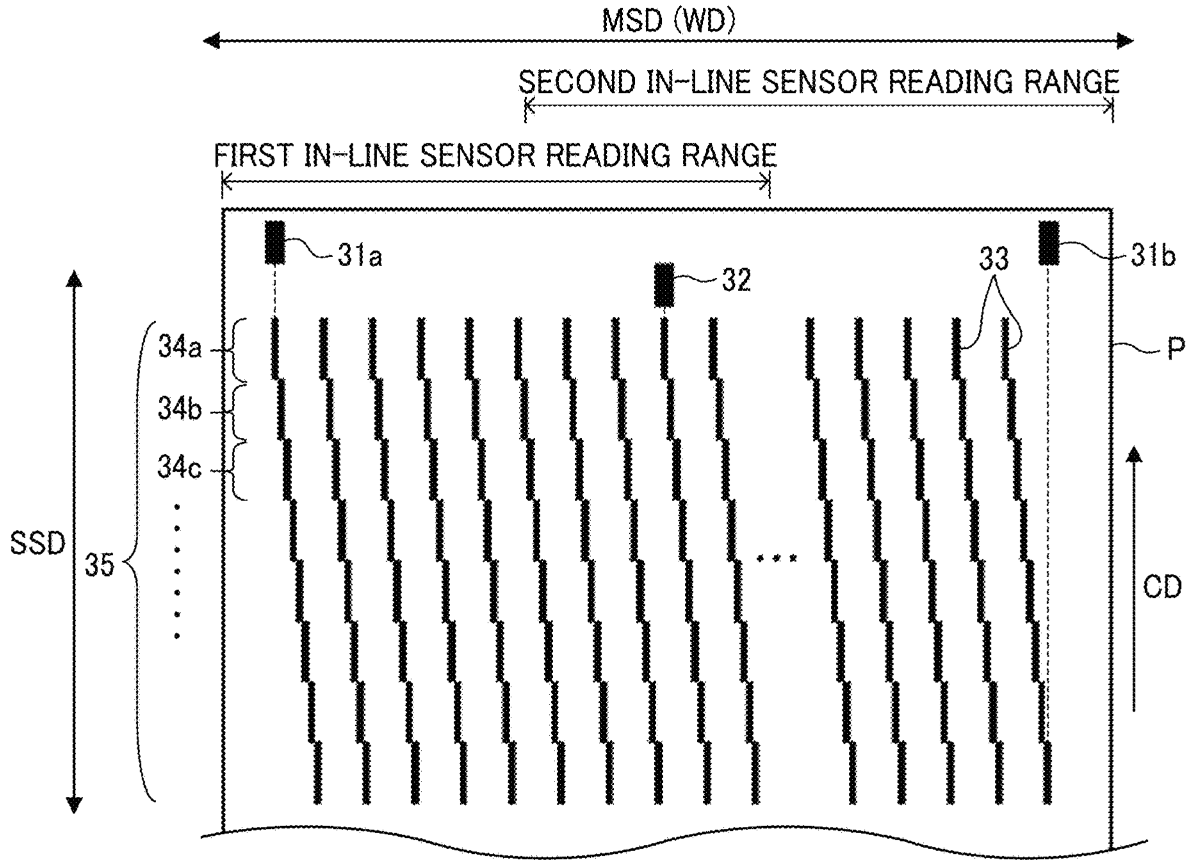
FIG. 8 is a diagram of a part of the sheet on which a test pattern for identifying the defective nozzle is printed.

However, from the flushing patterns 20*a* and 20*b* illustrated in FIG. 5, the controller determines whether or not there is a defective nozzle but does not identify which nozzle is defective. Since the resolution of the scanner unit 10 in the main scanning direction is low, it is difficult to accurately identify the position of the white streak from the read image of the flushing pattern by the scanner unit 10. In addition, since the fat line images of the flushing patterns 20*a* and 20*b* are arranged at narrow intervals in the main scanning direction, the line image may be merged with the adjacent line image. Since the interval between the line images is narrow, the line images may not be recognized one by one from the image read by the low-resolution scanner unit 10. Accordingly, it is difficult to associate the pixel of the read image with a nozzle number based on the line images of the flushing pattern. Therefore, the controller 11 suspends the consecutive printing operation and executes the defective nozzle identification control to identify a defective nozzle. In the defective nozzle identification control, the test pattern is formed by the printing drive waveform, in which line images are arranged at sufficient intervals as illustrated in FIG. 8. The scanner unit 10 reads the test pattern to identify a defective nozzle.

FIG. 8 is a diagram of a part of the sheet P on which the test pattern for identifying a defective nozzle is printed. As illustrated in FIG. 8, the test pattern for identifying a defective nozzle is formed on the sheet P. The controller 11 controls the liquid discharge by the liquid discharge head 230 to form the test pattern with the printing drive waveform. The test pattern for identifying a defective nozzle includes a start mark 32, end marks 31*a* and 31*b*, and a nozzle check pattern 35.

The end marks 31*a* and 31*b* are formed on both sides of the leading end of the sheet P in the main scanning direction. The start mark 32 is formed in the overlap region of the first in-line sensor 10*a* and the second in-line sensor 10*b* at the center of the sheet P in the main scanning direction. The start mark 32 is formed at a position upstream from the end marks 31*a* and 31*b* by one row in the conveyance direction of the sheet P. In addition, the start mark 32 is formed at the same position as a nozzle check line 33 at the center in the main scanning direction of a check line group 34*a* in the first row of the nozzle check pattern 35. The end mark 31*a* illustrated on the left side in FIG. 8 is formed at a position corresponding to the position of the nozzle disposed at one end of the nozzle row in the main scanning direction. On the other hand, the end mark 31*b* illustrated on the right side in FIG. 8 is formed at a position corresponding to the position of the nozzle disposed at the other end of the nozzle row in the main scanning direction.

The nozzle check pattern 35 for identifying a defective nozzle is formed upstream from the start mark 32 in the conveyance direction of the sheet P. The nozzle check pattern 35 includes multiple check line groups 34*a*, 34*b*, 34*c*, and so on, in which multiple nozzle check lines 33 are disposed at predetermined intervals in the main scanning direction. Each of the nozzle check lines 33 is a line image having a predetermined length in the sub-scanning direction, which is formed by discharging the ink from one nozzle for a predetermined time.

The liquid discharge head 230 forms the nozzle check lines 33 of the check line groups 34*a*, 34*b*, 34*c*, and so on with every n nozzles. The nozzles used for forming the check line groups 34*a*, 34*b*, 34*c*, and so on are different from each other. Specifically, the liquid discharge head 230 includes N nozzles arranged in the nozzle row, and the nozzle at one end of the nozzle row in the main scanning direction (the nozzle corresponding to the left end in FIG. 8) has the nozzle number 1. The nozzles used for forming the check line group 34*a* in the first row, which is the most downstream side in the conveyance direction, have the nozzle numbers 1, (1+n), (1+2n), . . . , (N−(n−1)). The nozzles used for forming the check line group 34*b* in the second row have the nozzle numbers (2+n), (2+2n), . . . , (N−(n−2)). The nozzles used for forming the check line group in the last row (n-th row) have the nozzle numbers n, 2n, . . . , N.

The in-line sensors 10*a* and 10*b* of the scanner unit 10 read the test pattern for identifying a defective nozzle formed on the sheet P. The nozzle check line 33 on the left side relative to the start mark 32 in FIG. 8 is detected based on the read image read by the first in-line sensor 10*a*. On the other hand, the nozzle check line 33 on the right side relative to the start mark 32 in FIG. 8 is detected based on the read image read by the second in-line sensor 10*b*.

Figure 9:
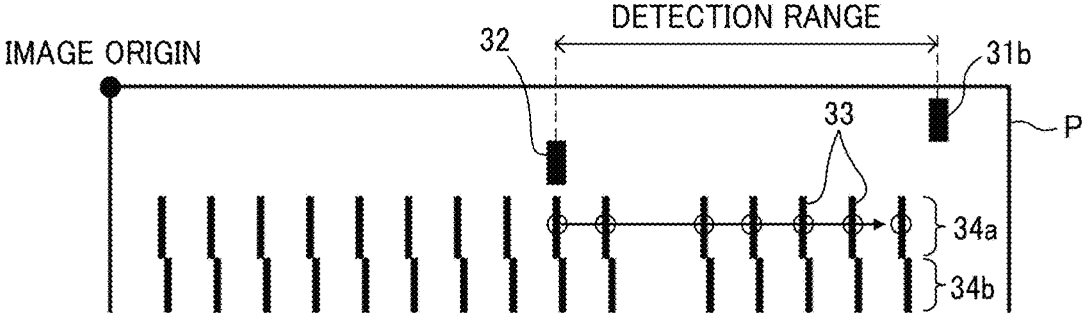
FIG. 9 is a diagram illustrating position detection of nozzle check lines of the test pattern in the main scanning direction.

FIG. 9 is a diagram illustrating position detection of the nozzle check line 33 in the main scanning direction. FIG. 9 illustrates the position detection in the main scanning direction of the nozzle check line 33 on the right side relative to the start mark 32 in FIG. 8, but the same applies to the left side relative to the start mark 32 in FIG. 8.

The controller 11 detects a position of the start mark 32 in the main scanning direction and a position of the end mark 31*b* in the main scanning direction from the read image read by the second in-line sensor 10*b*. The controller 11 sets a detection range of the nozzle check lines 33 based on the detected position of the start mark 32 in the main scanning direction and the detected position of the end mark 31*b* in the main scanning direction. The controller 11 detects a position of each nozzle check line 33 in the main scanning direction with reference to the position of the start mark 32 in the main scanning direction in the check line group 34*a* in the first row. Specifically, the controller 11 determines whether the pixel value is larger than the threshold for each pixel in the main scanning direction. When the pixel value is larger than the threshold, the controller 11 determines that the position of the pixel in the main scanning direction corresponds to the position of the nozzle check line 33 in the main scanning direction. An average of pixel values of multiple pixels in the sub-scanning direction is used as the pixel value of each pixel in the main scanning direction. Similarly, the positions of the nozzle check lines are detected in the check line groups 34*b*, 34*c*, . . . 34*n* in all rows. Note that each of the check line groups 34*a*, 34*b*, . . . , 34*n* is referred to as the check line group 34 unless distinguished.

Figure 10:
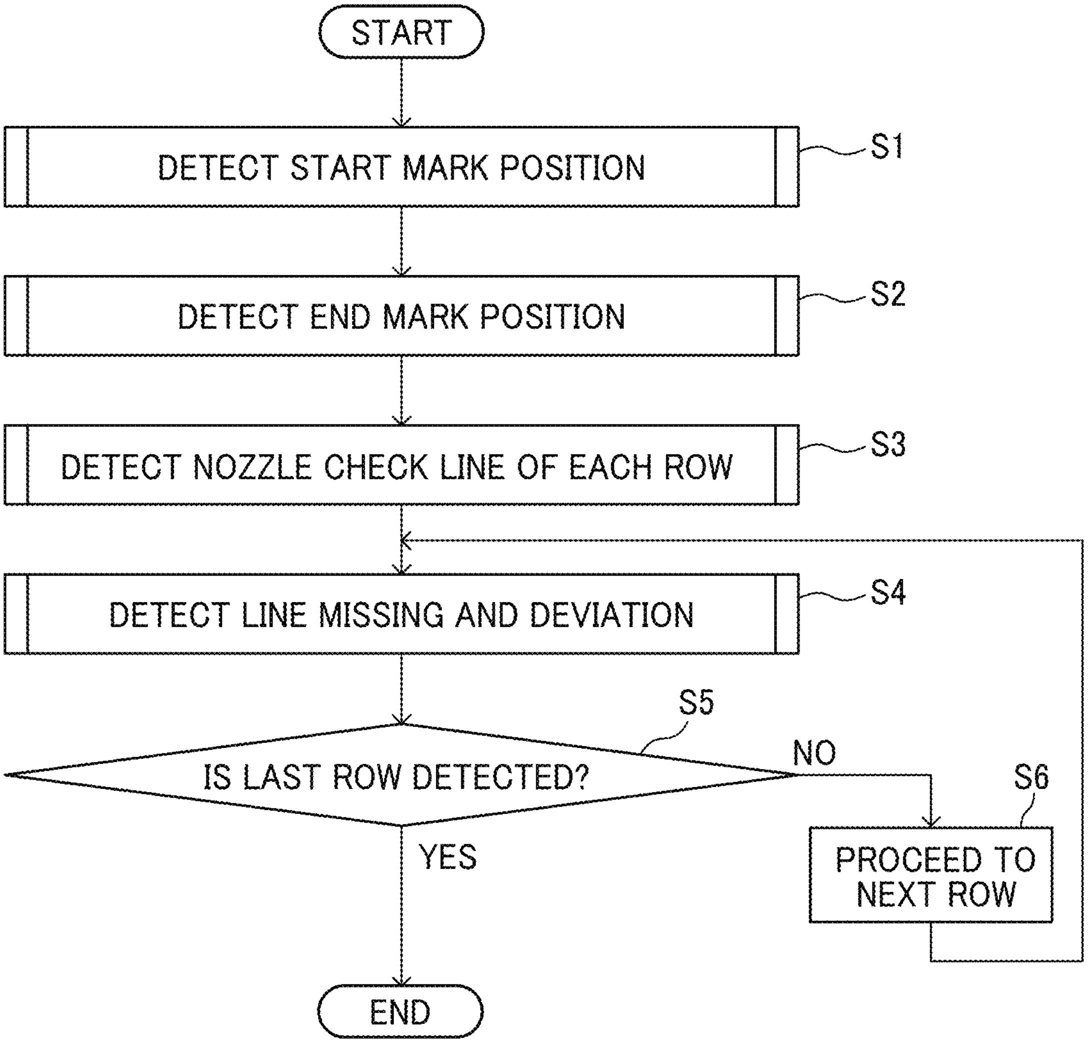
FIG. 10 is a flowchart of identifying the defective nozzle.

FIG. 10 is a flowchart of identifying a defective nozzle. As described above, the controller 11 detects the position of the start mark 32 in the main scanning direction and the position of the end mark 31*b* in the main scanning direction, and sets the detection range of the nozzle check line 33 (steps S1 and S2). The controller 11 detects the positions of the nozzle check lines 33 with reference to the start mark 32 in the check line group 34 in each row as illustrated in FIG. 9 (step S3).

The controller 11 detects the missing of the nozzle check line 33 and the deviation of the nozzle check line 33 in the check line group 34 in each row (step S4). The deviation of the nozzle check line 33 can be detected by any known process. When the check line group 34 that is not detected remains (No in step S5), the process proceeds to the next row (step S6). Then, when the controller 11 finishes detecting the missing of the nozzle check line 33 and the deviation of the nozzle check line 33 in the check line groups 34 in all rows (Yes in step S5), the process of identifying a defective nozzle ends.

Note that the nozzle check line 33 may be formed only for the nozzles in the vicinity of the position where the white streak appears in the flushing pattern to determine whether the nozzle is defective. When the controller 11 determines whether the nozzle is defective only in the vicinity of the position where the white streak appears in the flushing pattern, the length of the test pattern can be shortened in the sub-scanning direction. Accordingly, the test pattern may be formed in the leading end margin of the sheet P, which is disposed downstream from the print image area 21 on which a print image is to be printed in the conveyance direction, without suspending the consecutive printing operation.

The controller 11 stores the nozzle number of the defective nozzle and the number of the identified defective nozzles identified in the defective nozzle identification control in the memory 13. The image correction unit 12 performs image correction such as changing the dither pattern so as not to use the defective nozzle based on the nozzle number of the defective nozzle stored in the memory 13, and complements the defective nozzle using the nozzles adjacent to the defective nozzle.

Figure 11:
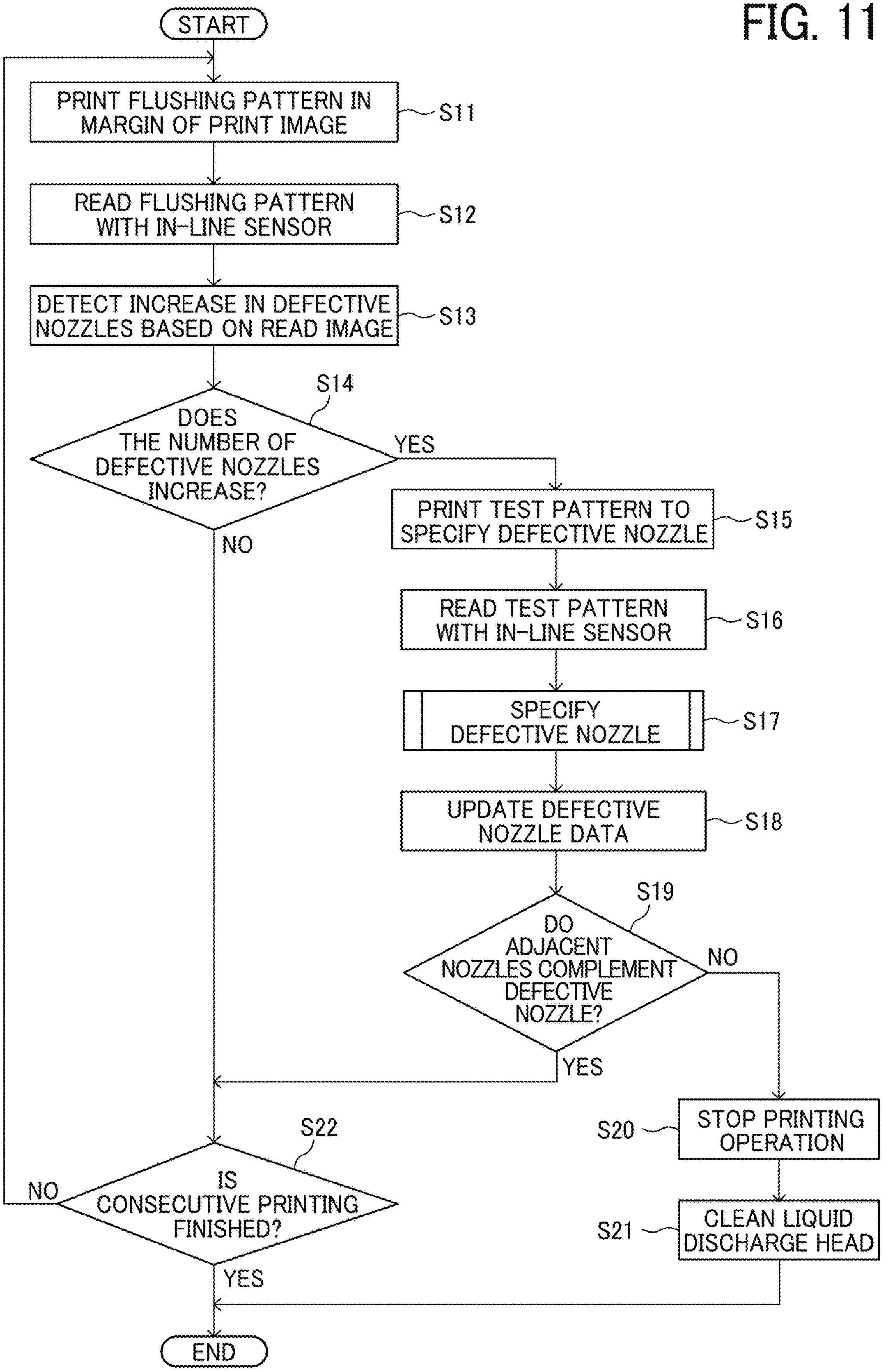
FIG. 11 is an overall flowchart of identifying the defective nozzle in the consecutive printing operation.

FIG. 11 is an overall flowchart of identifying a defective nozzle in the consecutive printing operation. The controller 11 causes the liquid discharge head 230 to discharge the ink in the nozzle onto the leading end margin and the trailing end margin of the sheet P on which a print image is to be formed to form the flushing patterns 20*a* and 20*b* illustrated in FIG. 5 (step S11). As described above, since the ink in the nozzle is discharged onto the leading end margin and the trailing end margin of the sheet P each time the print image is formed on the sheet P, the print image can be formed as desired. The portion of the sheet P on which the flushing pattern is formed is cut after printing operation.

The controller 11 causes the in-line sensors 10*a* and 10*b* to read the flushing patterns formed on the leading end margin and the trailing end margin of the sheet P (step S12). The controller 11 detects whether the number of the defective nozzles has increased from the previous defective nozzle identification control based on the number of white streaks in the flushing pattern read by the in-line sensors 10*a* and 10*b* (step S13).

When the controller 11 determines that the number of defective nozzles increases (Yes in S14), the controller 11 temporarily stops the consecutive printing operation and executes the defective nozzle identification control. When the defective nozzle identification control is executed, the controller 11 causes the liquid discharge head 230 to print the test pattern for identifying a defective nozzle illustrated in FIG. 8 on the sheet P (step S15), and causes the in-line sensors 10*a* and 10*b* to read the test pattern printed on the sheet P (step S16). Then, the controller 11 specifies a defective nozzle as described with reference to the flowchart illustrated in FIG. 10 (step S17).

The controller 11 stores the nozzle number of the defective nozzle newly identified in the defective nozzle identification control in the memory 13 to update the data of the defective nozzle (step S18). The image correction unit 12 determines whether the newly identified defective nozzle can be complemented by image correction using the nozzles adjacent to the defective nozzle based on the nozzle number of the defective nozzle previously identified by the defective nozzle identification control and the nozzle number of the newly identified defective nozzle (step S19). When the image correction unit 12 determines that the defective nozzle is not complemented by the image correction using the nozzles adjacent to the detective nozzle, the controller 11 stops the consecutive printing operation (step S20). Then, the controller 11 causes the liquid discharge head 230 to clean the nozzles to recover the defective nozzle (step S21).

On the other hand, when the image correction unit 12 determines that the defective nozzle can be complemented by the image correction using the nozzles adjacent to the defective nozzle (Yes in step S19), and the consecutive printing operation is not finished (No in step S22), the process returns to step S11, and the controller 11 resumes the consecutive printing operation. When the number of white streaks as the abnormal image in the flushing pattern does not increase and the number of defective nozzles does not increase (No in step S14), and when the consecutive printing operation is not finished (No in step S22), the controller 11 continues the consecutive printing operation. When the consecutive printing operation is finished (Yes in S22), the process ends.

As described above, in the present embodiment, the defective nozzle identification control is executed only when the number of abnormal images in the flushing pattern increases. Accordingly, the defective nozzle identification control can be executed when a defective nozzle newly occurs, for example, differing from the case where the defective nozzle identification control is executed periodically such as every predetermined number of sheets P. As a result, a desired image can be obtained. In addition, excessive defective nozzle identification control is not executed, thereby reducing waste sheets and consumption of the ink as compared with the case where the defective nozzle identification control is periodically executed.

Further, in the present embodiment, the flushing pattern is used for determining whether a defective nozzle newly occurs. Accordingly, the consumption of the ink can be reduced as compared with the case where a pattern for determining whether a defective nozzle newly occurs is formed separately from the flushing pattern. After the ink is discharged onto the leading end margin or the trailing end margin of the sheet P, if a pattern for determining whether a defective nozzle newly occurs is formed in the leading end margin or the trailing end margin of the sheet P, the leading end margin or the trailing end margin to form the pattern is required in addition to the flushing pattern. On the other hand, in the present embodiment, the leading end margin and the trailing end margin can be narrowed, and the print image area in which the print image is to be formed in the cut sheet can be widened.

In the present embodiment, the "liquid discharge head" refers to a functional component to discharge or eject liquid from the discharge orifice (nozzle). Liquid to be discharged through the nozzle of the liquid discharge head is not limited to a particular liquid as long as the liquid has a viscosity or surface tension to be discharged from the liquid discharge head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication. Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and a counter electrode.

In the present embodiment, each of the liquid discharge heads includes the plurality of liquid discharge head modules arranged in the sheet width direction, which is orthogonal to the conveyance direction, to form a long liquid discharge head (line head), and the liquid discharge head does not move with respect to an apparatus body of the liquid discharge apparatus. However, the liquid discharge head may be combined with other components to construct a "liquid discharge device," and the liquid discharge device may print while moving with respect to the apparatus body.

The "liquid discharge device" refers to a liquid discharge head integrated with functional components or mechanisms, i.e., an assembly of components related to liquid discharge. For example, the "liquid discharge device" may include a combination of the liquid discharge head with at least one of a supply-circulation mechanism, a carriage, a maintenance unit, and a main scan moving unit. Here, the integrated unit may be, for example, a combination in which the liquid discharge head and a functional part(s) are secured to each other through, e.g., fastening, bonding, or engaging, and a combination in which one of the liquid discharge head and a functional part(s) is movably held by another. The liquid discharge head may be detachably attached to the functional part(s) or unit(s) each other.

Examples of the liquid discharge device further include the liquid discharge head integrated with the supply-circulation mechanism. In this case, the liquid discharge head and the supply-circulation mechanism may be connected to each other with a tube. Furthermore, a filter unit may be disposed between the supply-circulation mechanism and the liquid discharge head. In another example, the liquid discharge device may be an integrated unit in which a liquid discharge head is integrated with a carriage. As yet another example, the liquid discharge device is a unit in which the liquid discharge head and the main-scanning moving mechanism are combined into a single unit. The liquid discharge head is movably held by a guide that is a part of the main-scanning moving mechanism. In another example, the cap that forms a part of the maintenance device is secured to the carriage mounting the liquid discharge head so that the liquid discharge head, the carriage, and the maintenance device are integrated as a single unit to form the liquid discharge device. Further, in still another example, the liquid discharge device includes tubes connected to the liquid discharge head mounting the supply-circulation mechanism or a channel component so that the liquid discharge head and the supply mechanism are integrated as a single unit. Through the tubes, the liquid in a liquid storage source is supplied to the liquid discharge head. The main-scanning moving mechanism may be a guide only. The supply mechanism may be a tube(s) only or a loading device only.

The "liquid discharge apparatus" includes the liquid discharge head or the liquid discharge device and drives the liquid discharge head to discharge liquid. The liquid discharge apparatus may be, for example, an apparatus capable of discharging liquid to a material onto which liquid can adhere or an apparatus to discharge liquid toward gas or into liquid. The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers so as to form a three-dimensional object. The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The term "material onto which liquid can adhere" represents a material onto which liquid is at least temporarily adhered, a material onto which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited. Examples of the "material onto which liquid can adhere" include any materials to which liquid can adhere even temporarily, such as paper, thread, fiber, fabric, leather, metal, plastic, glass, wood, and ceramic. The shape of the "material onto which liquid can adhere" is not limited to a sheet shape such as the sheet P, and may be any shape as long as liquid can adhere to the material. For example, the "material onto which liquid can adhere" may be used for film products, cloth products such as clothing, building materials such as wallpaper and flooring, and leather products.

The printer 1 according to the present embodiment is the "liquid discharge apparatus" to relatively move the liquid discharge head and the material onto which liquid can adhere. Examples of the liquid discharge apparatus that relatively moves the liquid discharge head and the material onto which liquid can adhere include a serial head apparatus that moves the liquid discharge head or a line head apparatus that does not move the liquid discharge head. The term "liquid discharge apparatus" is not limited to an apparatus to relatively move the liquid discharge head and the material onto which liquid can adhere.

Examples of the "liquid discharge apparatus" further include a treatment liquid coating apparatus to discharge a treatment liquid to a sheet to coat a surface of the sheet with the treatment liquid to reform the sheet surface. Examples of the "liquid discharge apparatus" further include an injection granulation apparatus in which a composition liquid including raw materials dispersed in a solution is injected through nozzles to granulate fine particles of the raw materials. In the present specification, the terms "image formation," "recording," "printing," "image printing," and "fabricating" used herein may be used synonymously with each other.

The embodiments described above are just examples, and the various aspects of the present disclosure attain respective effects as follows.

Aspect 1

A liquid discharge apparatus such as the printer 1 includes a liquid discharge head such as the liquid discharge head 230, circuitry such as the controller 11, and an image detector such as the in-line sensors 10*a* and 10*b*. The liquid discharge head includes multiple nozzles and discharges a liquid from the multiple nozzles. The circuitry causes the liquid discharge head to discharge the liquid from the multiple nozzles onto a recording medium such as the sheet P conveyed in a conveyance direction to form an image in an image area of the recording medium in a printing operation. The image detector reads the image formed on the recording medium by the liquid discharge head. The circuitry further causes the liquid discharge head to discharge the liquid from the multiple nozzles onto at least one of a leading end or a trailing end of the recording medium in the conveyance direction to form a flushing pattern such as the flushing patterns 20*a* and 20*b* different from the image on said at least one of the leading end or the trailing end of the recording medium in a flushing operation, causes the image detector to read the flushing pattern on the recording medium, detect a defective part in the flushing pattern read by the image detector, and identify a defective nozzle among the multiple nozzles based on the defective part.

When the circuitry causes the liquid discharge head to flush the thickened ink as the liquid in the multiple nozzles, if the multiple nozzles include the defective nozzle that does not discharge the liquid, an abnormal image such as a white streak appears in the flushing pattern formed in the flushing operation. Accordingly, the defective nozzle can be detected based on the abnormal image in the flushing pattern. When the circuitry determines that there is a defective nozzle, the defective nozzle identification control is executed, in which a test pattern is formed on the recording medium to accurately identify the defective nozzle. This is because it is difficult to associate the position of the nozzle with the position of each pixel of the image read by the image detector having the low resolution in the main scanning direction. As a result, the defective nozzle may not be identified based on the position of the white streak in the flushing pattern read by the image detector.

In Aspect 1, for example, during the normal printing operation, the circuitry causes the liquid discharge head to discharge the liquid in the multiple nozzles onto at least one of the leading end or the trailing end of the recording medium in the conveyance direction of the recording medium in the flushing operation, thereby forming only the flushing pattern. When the circuitry determines that there is a defective nozzle based on the abnormal image in the flushing pattern, the circuitry executes the detective nozzle identification control. Thus, when there is no abnormal image in the flushing pattern, the defective nozzle identification control can be omitted, and the test pattern for identifying a defective nozzle is not formed on the recording medium. With this configuration, in the present embodiment, the consumption of the liquid can be reduced as compared with the apparatus according to a comparative example in which the flushing pattern and the test pattern are formed each time a new recording medium is conveyed from the feeding device to the position facing the liquid discharge head.

Further, since only the flushing pattern can be formed at the leading end or the trailing end of the recording medium in the present embodiment, the margin of the leading end or the trailing end in which the pattern is formed can be narrowed compared with the case where both the flushing pattern and the test pattern are formed at the leading end or the trailing end.

Aspect 2

In Aspect 1, the circuitry applies a first drive waveform to the liquid discharge head in the flushing operation and applies a second drive waveform different from the first drive waveform to the liquid discharge in the printing operation.

Accordingly, the thickened ink in the nozzle can be sufficiently discharged in the flushing operation as compared with the case where the liquid discharge in the flushing operation is the same as the liquid discharge in the priming operation.

Aspect 3

In Aspect 2, the first drive waveform causes the liquid discharge head to discharge a first volume of the liquid in the flushing operation, and the second drive waveform causes the liquid discharge head to discharge a second volume smaller than the first volume of the liquid in the printing operation.

Accordingly, the thickened ink in the nozzle can be sufficiently discharged in the flushing operation.

Aspect 4

In Aspect 2 or 3, the first drive waveform causes the liquid discharge head to discharge the liquid at a first velocity in the flushing operation, and the second drive waveform causes the liquid discharge head to discharge the liquid at a second velocity smaller than the first velocity in the printing operation.

Accordingly, the thickened ink in the nozzle can be sufficiently discharged in the flushing operation.

Aspect 5

In any one of Aspects 1 to 4, the circuitry causes the liquid discharge head to discharge the liquid in every two or more nozzles out of the multiple nozzles in a nozzle array direction orthogonal to the conveyance direction.

Accordingly, as described in the above embodiment, the liquid discharge by the liquid discharge head in the flushing operation is different from the liquid discharge by the liquid discharge head in the printing operation to sufficiently discharge the thickened ink in the nozzle, so that an image such as a line image formed with the liquid discharged from the nozzle in the flushing operation is fatter than an image formed with the liquid discharged from the nozzle in the printing operation. As a result, the images formed with the liquid discharged from adjacent nozzles may overlap each other, and the abnormal image such as the white streak may not appear in the flushing pattern even if there is a defective nozzle.

Therefore, in Aspect 5, the liquid discharge head forms the flushing pattern by thinning out one or more nozzles so that the abnormal image such as the white streak reliably appears in the flushing pattern when a defective nozzle occurs. Accordingly, the defective nozzle can be detected based on the flushing pattern.

Aspect 6

In any one of Aspects 1 to 4, the circuitry causes the liquid discharge head to discharge the liquid from a first group of the multiple nozzles onto the leading end such as the leading end margin of the recording medium in the conveyance direction to form a first flushing pattern in the flushing operation and causes the liquid discharge head to discharge the liquid from a second group of the multiple nozzles, different from the first group of the multiple nozzles, onto the trailing end such as the trailing end margin of the recording medium in the conveyance direction to form a second flushing pattern in the flushing operation.

Aspect 7

In Aspect 6, the first group of the multiple nozzles includes every two or more nozzles out of the multiple nozzles in a nozzle array direction orthogonal to the conveyance direction, and the second group of the multiple nozzles includes a part of remaining nozzles other than said every two or more nozzles out of the multiple nozzles in the nozzle array direction.

Aspect 8

In Aspect 6, the first group of the multiple nozzles includes every other nozzle out of the multiple nozzles in a nozzle array direction orthogonal to the conveyance direction, and the second group of the multiple nozzles includes remaining nozzles other than said every other nozzle out of the multiple nozzles in the nozzle array direction.

Accordingly, all the nozzles can be discharged, and a defective nozzle can be detected while one recording medium passes through the image forming unit.

Aspect 9

In any one of aspects 1 to 8, the circuitry causes the liquid discharge head to form the image in the image area of the recording medium based on image data in the printing operation, and the circuitry such as the image correction unit 12 corrects the image data based on the defective nozzle.

Accordingly, as described in the above embodiment, the circuitry such as the image correction unit 12 corrects the print image and complements the defective nozzle using the nozzles adjacent to the defective nozzle, thereby reducing the abnormal image due to the defective nozzle.

Aspect 10

In Aspect 9, the circuitry such as the controller 11 identifies another defective nozzle in response to an increase in a number of the defective part in the flushing pattern.

Accordingly, when the number of the defective parts (i.e., the abnormal images) in the flushing pattern increases and a defective nozzle newly occurs, the circuitry executes the defective nozzle identification control. As a result, the test pattern can be formed at an appropriate timing, thereby reducing unnecessary consumption of the liquid.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a liquid discharge head including multiple nozzles, the liquid discharge head configured to discharge a liquid from the multiple nozzles;

circuitry configured to cause the liquid discharge head to discharge the liquid from the multiple nozzles onto a recording medium conveyed in a conveyance direction to form an image in an image area of the recording medium in a printing operation; and an image detector configured to read the image formed on the recording medium by the liquid discharge head, wherein the circuitry is further configured to:

cause the liquid discharge head to discharge the liquid from the multiple nozzles onto at least one of a leading end or a trailing end of the recording medium in the conveyance direction to form a flushing pattern different from the image on said at least one of the leading end or the trailing end of the recording medium in a flushing operation;

cause the image detector to read the flushing pattern on the recording medium;

detect a defective part in the flushing pattern read by the image detector;

identify a defective nozzle among the multiple nozzles based on the defective part;

detect an increase in a number of the defective nozzle among the multiple nozzles based on the defective part;

cause the liquid discharge head to print a test pattern in the image area of the recording medium in the printing operation;

cause the image detector to read the test pattern in the image area of the recording medium; and specify the defective nozzle among the multiple nozzles based on the test pattern read by the image detector.

2. The liquid discharge apparatus according to claim 1, wherein the circuitry is further configured to:
apply a first drive waveform to the liquid discharge head in the flushing operation; and
apply a second drive waveform different from the first drive waveform to the liquid discharge head in the printing operation.

3. The liquid discharge apparatus according to claim 2, wherein the first drive waveform causes the liquid discharge head to discharge a first volume of the liquid in the flushing operation, and
the second drive waveform causes the liquid discharge head to discharge a second volume smaller than the first volume of the liquid in the printing operation.

4. The liquid discharge apparatus according to claim 2, wherein the first drive waveform causes the liquid discharge head to discharge the liquid at a first velocity in the flushing operation, and
the second drive waveform causes the liquid discharge head to discharge the liquid at a second velocity smaller than the first velocity in the printing operation.

5. The liquid discharge apparatus according to claim 1, wherein the circuitry is further configured to cause the liquid discharge head to discharge the liquid in every two or more nozzles out of the multiple nozzles in a nozzle array direction orthogonal to the conveyance direction.

6. The liquid discharge apparatus according to claim 1, wherein the circuitry is further configured to:
cause the liquid discharge head to discharge the liquid from a first group of the multiple nozzles onto the leading end of the recording medium in the conveyance direction to form a first flushing pattern in the flushing operation; and
cause the liquid discharge head to discharge the liquid from a second group of the multiple nozzles, different from the first group of the multiple nozzles, onto the trailing end of the recording medium in the conveyance direction to form a second flushing pattern in the flushing operation.

7. The liquid discharge apparatus according to claim 6, wherein the first group of the multiple nozzles includes every two or more nozzles out of the multiple nozzles in a nozzle array direction orthogonal to the conveyance direction, and
the second group of the multiple nozzles includes a part of remaining nozzles other than said every two or more nozzles out of the multiple nozzles in the nozzle array direction.

8. The liquid discharge apparatus according to claim 6, wherein the first group of the multiple nozzles includes every other nozzle out of the multiple nozzles in a nozzle array direction orthogonal to the conveyance direction, and
the second group of the multiple nozzles includes remaining nozzles other than said every other nozzle out of the multiple nozzles in the nozzle array direction.

9. The liquid discharge apparatus according to claim 1, wherein the circuitry causes the liquid discharge head to form the image in the image area of the recording medium based on image data in the printing operation; and
the circuitry is further configured to correct the image data based on the defective nozzle.

10. The liquid discharge apparatus according to claim 9, wherein the circuitry is further configured to identify another defective nozzle in response to an increase in a number of the defective part in the flushing pattern.

11. The liquid discharge apparatus according to claim 1, wherein the test pattern includes a start mark formed at a center of the recording medium in a main scanning direction, two end marks respectively formed on both sides of the leading end of the recording medium in the main scanning direction, and a nozzle check pattern formed upstream from the start mark in the conveyance direction of the recording medium.

12. The liquid discharge apparatus according to claim 11, wherein the nozzle check pattern includes multiple check line groups in which multiple nozzle check lines are disposed at predetermined intervals in the main scanning direction, and each of the multiple nozzle check lines is a line image having a predetermined length in the conveyance direction, which is formed by discharging the ink from one nozzle for a predetermined time.

* * * * *